(12) United States Patent
Mourad et al.

(10) Patent No.: US 12,066,294 B2
(45) Date of Patent: Aug. 20, 2024

(54) APPARATUS, METHOD AND COMPUTER PROGRAM FOR A VEHICLE

(71) Applicant: Bayerische Motoren Werke Aktiengesellschaft, Munich (DE)

(72) Inventors: Alaa Mourad, Munich (DE); Alexander Krebs, Munich (DE); Markus Strassberger, Wartenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 17 days.

(21) Appl. No.: 17/781,347

(22) PCT Filed: Sep. 23, 2020

(86) PCT No.: PCT/EP2020/076479
§ 371 (c)(1),
(2) Date: May 31, 2022

(87) PCT Pub. No.: WO2021/151527
PCT Pub. Date: Aug. 5, 2021

(65) Prior Publication Data
US 2022/0412754 A1 Dec. 29, 2022

(30) Foreign Application Priority Data
Jan. 31, 2020 (EP) ..................... 20154958

(51) Int. Cl.
*G01C 21/34* (2006.01)
(52) U.S. Cl.
CPC ............... *G01C 21/3438* (2013.01)
(58) Field of Classification Search
CPC ................................ G01C 21/3438
See application file for complete search history.

(56) References Cited

U.S. PATENT DOCUMENTS

2017/0277191 A1* 9/2017 Fairfield ............... G05D 1/0212
2018/0338229 A1* 11/2018 Nemec ................... H04W 4/40
(Continued)

FOREIGN PATENT DOCUMENTS

WO      2019202836 A1    10/2019

OTHER PUBLICATIONS

International Search Report corresponding to International Patent Application No. PCT/EP2020/076479, dated Nov. 16, 2020 (5 pages).

(Continued)

*Primary Examiner* — Dale Moyer
(74) *Attorney, Agent, or Firm* — Maginot, Moore & Beck LLP (57) ABSTRACT

An apparatus for a vehicle includes processing circuitry configured to obtain identification information on a future passenger of the vehicle, the identification information comprising an ultra-wideband communication identification of a mobile device of the future passenger. The processing circuitry is also configured to locate the future passenger outside the vehicle using ultra-wideband communication, the ultra-wideband communication being performed between an ultra-wideband transceiver of the vehicle and the mobile device of the future passenger and being based on the ultra-wideband communication identification of the mobile device. The processing circuitry is further configured to compute guidance information based on the location of the future passenger of the vehicle, and provide the guidance information via an interface.

18 Claims, 2 Drawing Sheets

(56) References Cited

U.S. PATENT DOCUMENTS

| | | | |
|---|---|---|---|
| 2018/0354411 A1* | 12/2018 | Shmueli Friedland | .................. |
| | | | G05D 1/0278 |
| 2019/0106050 A1* | 4/2019 | Kamhi | ................... B60Q 1/247 |
| 2019/0286928 A1* | 9/2019 | Hubschman | ......... G06V 40/172 |
| 2020/0043344 A1* | 2/2020 | Shimizu | ................ G06Q 50/40 |
| 2020/0245101 A1* | 7/2020 | Schober | ............... H04W 4/029 |
| 2020/0359215 A1* | 11/2020 | Akpinar | ................ G06F 21/31 |
| 2020/0359216 A1* | 11/2020 | Akpinar | ............... H04W 4/024 |
| 2021/0026347 A1* | 1/2021 | Nakashima | ............ H04W 4/40 |
| 2021/0136556 A1* | 5/2021 | Lee | ..................... H04W 76/15 |
| 2023/0391371 A1* | 12/2023 | Donderici | ............. G06F 30/20 |

OTHER PUBLICATIONS

Written Opinion corresponding to International Patent Application No. PCT/EP2020/076479, dated Nov. 16, 2020 (13 pages).
Extended European Search Report corresponding to International Patent Application No. PCT/EP2020/076479, dated Jul. 8, 2020 (4 pages).

\* cited by examiner

APPARATUS, METHOD AND COMPUTER PROGRAM FOR A VEHICLE

The present application is the U.S. national phase of PCT Application PCT/EP2020/076479 filed on Sep. 23, 2020, which claims priority of European patent application No. 20154958.1 filed on Jan. 31, 2020, which is incorporated herein by reference in its entirety.

FIELD

Examples relate to an apparatus, a method and a computer program for a vehicle, more precisely, but not exclusively, to a concept for determining guidance information based on a localization of a future passenger of the vehicle that is based on ultra-wideband communication.

BACKGROUND

In ride-hailing services, i.e. services for transporting passengers (either with a driver or fully services), one of the challenges is to (unambiguously) identify the future passengers when they wait around the agreed-upon pick-up point at the roadside. In order to pick the passenger up, the vehicle may drive to (and stop close to) the future passenger in a targeted and precise manner.

In some concepts, the driver may be identified by scanning the environment, e.g. using a 3D camera or lidar systems. Such a concept is shown in US20180354411A1, where a 3D camera and other sensors are used to scan the environment and thus identify the passenger at the side of the road. Once the passenger is identified, a lighting system is used to guide the passenger to the vehicle.

SUMMARY

There may be a desire for an improved concept for locating a passenger of a ride-hailing vehicle at the side of the road.

This desire is addressed by the subject-matter of the independent claims.

Embodiments are based on the finding that ultra-wideband communication can be used to perform a highly precise localization of a future passenger via their mobile device. Compared to previous approaches, such as the one introduced above, this may enable a highly precise localization of the future passenger even in crowded areas. As ride-hailing services are often ordered on a mobile device, the same device may be used to identify the user vis-à-vis the vehicle, and to correspondingly locate them at the side of the road.

Embodiments of the present disclosure provide an apparatus for a vehicle. The apparatus comprises processing circuitry that is configured to obtain identification information on a future passenger of the vehicle. The identification information comprises an ultra-wideband communication identification of a mobile device of the future passenger. The processing circuitry is configured to locate the future passenger outside the vehicle using ultra-wideband communication. The ultra-wideband communication is performed between an ultra-wideband transceiver of the vehicle and the mobile device of the future passenger. The ultra-wideband communication is based on the ultra-wideband communication identification of the mobile device. The processing circuitry is configured to compute guidance information based on the location of the future passenger of the vehicle. The processing circuitry is configured to provide the guidance information via an interface. By determining the location using the ultra-wideband communication, a precision of the localization may be improved, and the future passenger may be located within a group of people.

For example, the processing circuitry may be configured to locate the future passenger by determining a time of flight of the ultra-wideband communication and by determining an angle of arrival of the ultra-wideband communication. The time-of-flight may be used to determine the distance between the vehicle and the mobile device. The angle of arrival may be used to determine at which angle the mobile device is located relative to the vehicle. The distance and the angle may be used in combination to determine the location of the future passenger relative to the vehicle.

In some embodiments, additional measures may be taken to identify the future passenger, e.g. if the UWB-based localization returns an ambiguous result, or if the future passenger is on the move. For example, the processing circuitry may be configured to locate the future passenger outside the vehicle further using a visual identification of the future passenger. Using the visual identification, the future passenger may be identified among a set of candidates.

For example, the processing circuitry may be configured to receive image data of the future passenger from the mobile device of the passenger via a short-range communication transceiver of the vehicle. The received image data may be used to identify, and thus locate, the future passenger. In other words, the visual identification of the future passenger may be based on the received image data of the future passenger.

In various embodiments, the processing circuitry may be configured to obtain further image data from a camera sensor of the vehicle based on the determined location of the future passenger. The processing circuitry may be configured to compare the further image data to the image data received from the mobile device of the passenger. The processing circuitry may be configured to provide access to the vehicle if a similarity between the further image data and the received image data is higher than a similarity threshold. This may be used to determine whether to open or unlock a door of the vehicle when a person approaches the door.

The guidance information may comprise guidance information for the vehicle. In other words, the guidance information may be suitable for guiding the vehicle. The guidance information may indicate a location of the future passenger relative to the vehicle. This may enable a driver or an autonomous driving system of the vehicle to identify the future passenger and/or to select an appropriate halting position.

For example, the guidance information for the vehicle may be provided to a human driver of the vehicle. This may enable the driver to identify the future passenger, and to select an appropriate halting position and open the door to the "right" person.

For example, the guidance information may comprise image data of the future passenger received from the mobile device of the passenger. This image data may enable the driver to identify the future passenger among multiple possible candidates.

Alternatively or additionally, the guidance information for the vehicle may be provided to an automated driving system of the vehicle. This may enable the automated driving system to select an appropriate halting position.

Alternatively, the halting position may be provided by the apparatus. In other words, the guidance information for the vehicle may comprise information on a halting position of the vehicle for providing access to the future passenger. The processing circuitry may be configured to determine the halting position of the vehicle based on the location of the future passenger. This may reduce a workload of the driver or of the automated driving system.

In some embodiments, the processing circuitry may be configured to process an environment of the future passenger to determine the halting position. This may avoid situations, in which access to the vehicle is more difficult than necessary, e.g. due to obstacles at the side of the road. For example, the processing circuitry may be configured to obtain sensor data relating to the environment of the future passenger from one or more sensors of the vehicle. The processing circuitry may be configured to process the sensor data to process the environment of the future passenger.

In various embodiments, the processing circuitry may be configured to determine the halting position based on information on a vehicle door to be used by the future passenger for access to the vehicle. This may be beneficial in situations with passengers with disabilities, which might require access to a specific vehicle door of the vehicle.

In some embodiments, guidance information might also be provided to the future passenger. For example, the guidance information may comprise guidance information for the future passenger. The guidance information may indicate a location of the vehicle relative to the future passenger. The guidance information may be provided to the future passenger via a display of the vehicle or via the mobile device of the future passenger. This may facilitate an identification of the vehicle for the future passenger.

Embodiments of the present disclosure further provide a corresponding method for a vehicle. The method comprises obtaining identification information on a future passenger of the vehicle. The identification information comprises an ultra-wideband communication identification of a mobile device of the future passenger. The method comprises locating the future passenger outside the vehicle using ultra-wideband communication. The ultra-wideband communication is performed between an ultra-wideband transceiver of the vehicle and the mobile device of the future passenger. The ultra-wideband communication is based on the ultra-wideband communication identification of the mobile device. The method comprises computing guidance information based on the location of the future passenger of the vehicle. The method comprises providing the guidance information via an interface.

Embodiments of the present disclosure further provide a computer program having a program code for performing the method, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
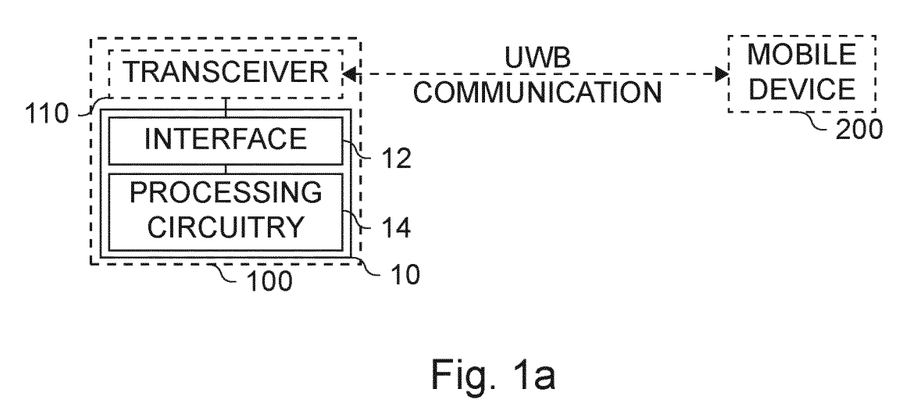
FIGS. 1a and 1b show block diagrams of embodiments of an apparatus for a vehicle and of a vehicle comprising such an apparatus.
Figure 1B:
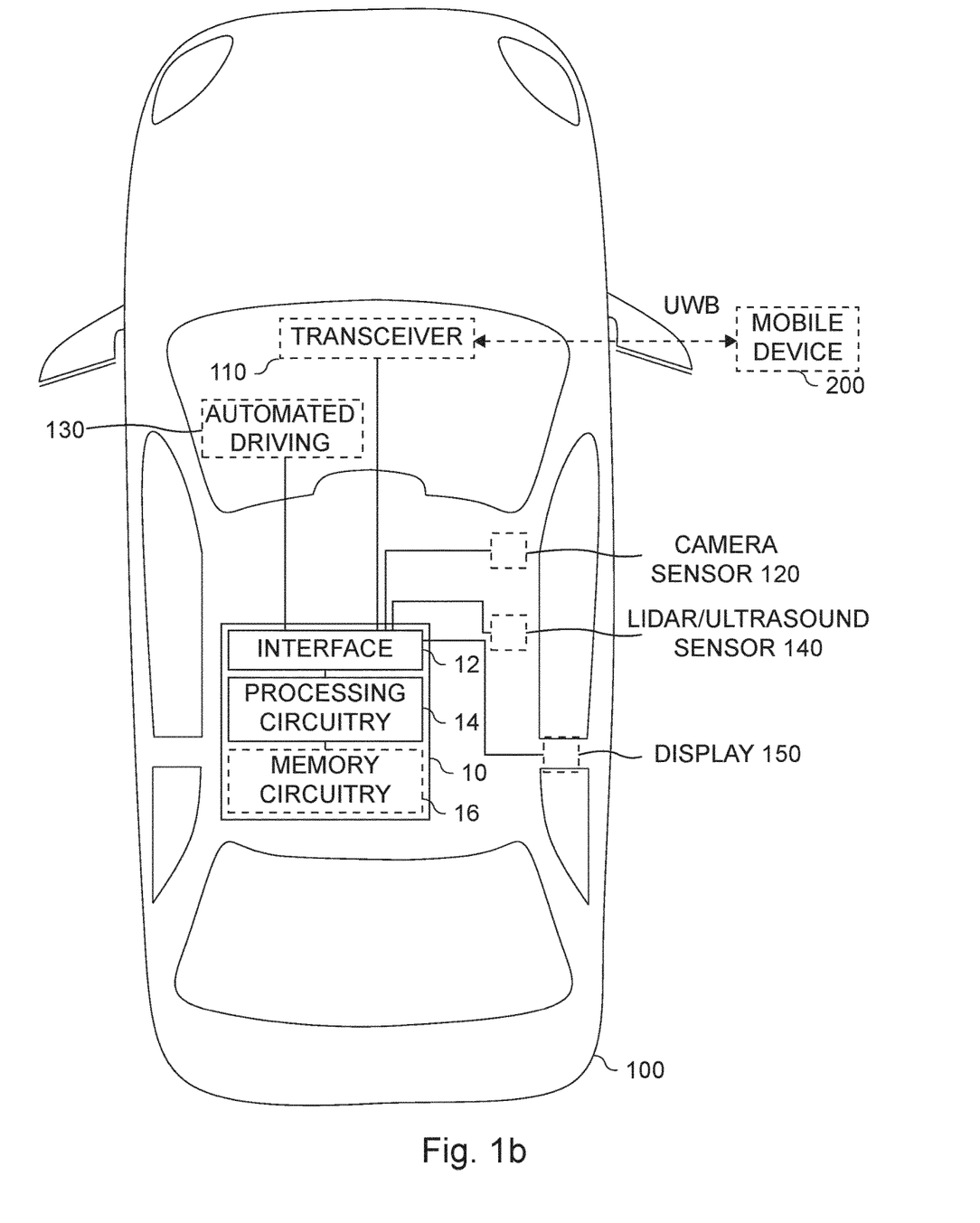

FIGS. 1a and 1b show block diagrams of embodiments of an apparatus 10 for a vehicle 100 and of a vehicle 100 comprising such an apparatus 10. The apparatus comprises processing circuitry 14 and an interface 12. Optionally, the apparatus may further comprise memory circuitry 16 for storing information. In the following, the functionality of the processing circuitry is described. In some cases, however, the processing circuitry makes use of the respective functionalities of the interface 12 and/or of the memory circuitry 16. Accordingly, the processing circuitry is coupled to the interface 12 and/or to the (optional) memory circuitry 16.

The processing circuitry is configured to obtain identification information on a future passenger of the vehicle. The identification information comprises an ultra-wideband communication identification of a mobile device 200 of the future passenger. The processing circuitry is configured to locate the future passenger outside the vehicle using ultra-wideband communication. The ultra-wideband communication is performed between an ultra-wideband transceiver 110 of the vehicle and the mobile device of the future passenger. The ultra-wideband communication is based on the ultra-wideband communication identification of the mobile device. The processing circuitry is configured to compute guidance information based on the location of the future passenger of the vehicle. The processing circuitry is configured to provide the guidance information via the interface 12.

Embodiments of the present disclosure generally relate to an apparatus, a method and a computer program for a vehicle. Embodiments use an ultra-wideband communication-based localization to locate a future passenger of the vehicle, to improve a provision of guidance information for the vehicle and/or for the passenger. The ultra-wide band system (UWB) is being introduced into the automotive sector at a fast pace due to its great potential. The UWB system provides high accuracy ranging, which can be used for different applications. A major application in the automotive domain relates to the protection of car access system against security attacks (e.g. relay attacks). However, UWB is also promising for other applications. UWB integration in consumer electronic devices (e.g. smartphones) may open the door for different use cases. Embodiments of the present disclosure use UWB to improve a passenger pick up, e.g. by autonomous driving taxis.

Embodiments use ultra-wideband communication to locate a passenger. This is a two-pronged approach—for once, if UWB communication, which is fairly low-range communication, can be established between the vehicle and the mobile device, the mobile device, and thus its user, may be assumed to be nearby. Additionally, UWB supports a highly precise determination of a distance between two transceivers, based on a time of flight of the communication signals, and also the determination of the angle of arrival of the communication signals. A combination of the distance and of the angle of arrival may provide a highly precise location of the mobile device relative to the vehicle. For example, the mobile device may be one of a cellular phone, a smartphone, a tablet computer, a wearable device, a fitness tracker, and a smartwatch. Such devices are usually held or stored at close proximity to the future passenger, thus enabling a localization of the future passenger via their mobile device.

In general, the process may start with an allocation of the passenger to the specific vehicle. This may comprise the provision of information on the future passenger to the vehicle, e.g. by a server of the ride-hailing (or ridesharing) service. In the context of this application, the broader term "ride-hailing" is used both for taxi-like ride-hailing services that transport a single individual or a coherent group of passengers, and for ride-sharing services, where multiple passengers may be independently picked up by the vehicle. For example, the information on the future passenger may comprise identification information on the future passenger, to enable the vehicle and/or a driver of the vehicle to identify the passenger, which may be received from a server of the ride-hailing service, e.g. via a cellular transceiver of the vehicle and the interface 12. The identification information comprises an ultra-wideband communication identification of a mobile device 200 of the future passenger, e.g. a permanent or temporary (hardware or network) address of the mobile device. The processing circuitry may be configured to use the ultra-wideband communication identification of the mobile device to detect a presence of the mobile device in a vicinity (i.e. within range) of the vehicle, e.g. by listening for a beacon signal of the mobile device, or by transmitting a signal that announces to the mobile device the presence of the (ultra-wideband transceiver 110 of) the vehicle.

In general, the detection of the presence may be started when the vehicle approaches a pickup point of the future passenger, e.g. based on a satellite-based positioning system, such as the Global Positioning System (GPS). In some embodiments, the processing circuitry may be configured to obtain information on a position of the future passenger from the mobile device of the passenger, e.g. via the server of the ride-hailing service. If the position of the vehicle and the position of the future passenger are within a pre-defined range (of each other, or of the pick-up point), the detection of the presence may be started.

Once the presence of the mobile device is detected, the ultra-wideband communication may be established between the vehicle (i.e. the ultra-wideband transceiver of the vehicle) and the mobile device. In other words, the processing circuitry may be configured to establish the ultra-wideband communication between the vehicle and the mobile device (e.g. via the interface 12 and the ultra-wideband transceiver 110). For example, the processing circuitry may be configured to use the ultra-wideband communication identification of the mobile device to establish the ultra-wideband communication between the (ultra-wideband transceiver 110 of) the vehicle and the mobile device.

Once the (two-way) communication is established, the communication may be used to locate the mobile device, and thus the future [passenger. In other words, the future passenger, i.e. the mobile device of the future passenger, may be located based on a two-way communication between the ultra-wideband transceiver of the vehicle and the mobile device. For example, the processing circuitry may be configured to determine a distance between the vehicle and the mobile device and the vehicle based on the ultra-wideband communication. For example, the processing circuitry may be configured to determine a time of flight of the ultra-wideband communication between the mobile device and the ultra-wideband transceiver of the vehicle, e.g. by determining a time offset between the transmission of an ultra-wideband signal and the corresponding reception of the signal by the respective other ultra-wideband transceiver.

To improve the precision of the distance determination, multiple ultra-wideband signals may be exchanged between the two transceivers, and a drift and/or a misalignment of the internal clocks of the transceivers may be compensated for based on the multiple ultra-wideband signals. In some embodiments, determining the distance/time of flight may comprise obtaining information on the distance from the ultra-wideband transceiver, e.g. if the distance determination is provided by the ultra-wideband transceiver. Additionally, the processing circuitry may be configured to determine an angle of arrival of the ultra-wideband communication, e.g. using the MUltiple SIgnal Classification (MUSIC) algorithm. In some embodiments, determining the angle of arrival may comprise obtaining information on the angle of arrival from the ultra-wideband transceiver, e.g. if the angle of arrival determination is performed by the ultra-wideband transceiver. The processing circuitry may be configured to locate the future passenger by determining a time of flight of the ultra-wideband communication and by determining the angle of arrival of the ultra-wideband communication. For example, the mobile device of the future passenger, and thus the future passenger, may be located at a position that is offset by the angle of arrival and the distance from the ultra-wideband transceiver of the vehicle.

In some embodiments, an additional visual identification may be used to locate the future passenger outside the vehicle, e.g. in cases where multiple persons fit the determined location of the future passenger, or if the future passenger is on the move. Accordingly, the processing circuitry may be configured to locate the future passenger outside the vehicle further using a visual identification of the future passenger. For example, a camera sensor 120 of the vehicle may be used to locate the future passenger outside the vehicle. For example, the processing circuitry may be configured to obtain further image data from the camera sensor 120 of the vehicle. For example, the camera sensor may be pointed on the location of the future passenger that is determined based on the ultra-wideband communication, or (only) a section of the further image data may be processed that corresponds to the location of the future passenger that is determined based on the ultra-wideband communication. In other words, the further image data may be based on the determined location of the future passenger. The processing circuitry may be configured to process the further image data to identify and locate the future passenger within the further image data. The identification of the future passenger may be based on image data of the future passenger. For example, the image data may depict at least a face of the future passenger. Accordingly, the image data may be a selfie of the future passenger (which may be taken after booking the trip and before pickup), or an image of the future passenger that is comprised within the identification information of the future passenger. Accordingly, the image data of the future passenger may be received from the mobile device of the passenger or from the service of the ride-hailing service. For example, the processing circuitry may be configured to receive the image data of the future passenger from the mobile device of the passenger via a short-range communication transceiver 110 of the vehicle, e.g. via ultra-wideband communication, via a wireless local area network according to IEEE standard 802.11 (Institute of Electrical and Electronics Engineers), or via Bluetooth (Low Energy). The visual identification of the future passenger may be based on the received image data of the future passenger.

The processing circuitry may be configured to compare the further image data to the image data of the passenger to identify the future passenger, and to locate the passenger outside the vehicle after identifying the future passenger within the further image data (e.g. by correlating the position of the future passenger within the further image data with a location relative to the vehicle). In some embodiments, the processing circuitry may be configured to update the location of the future passenger by tracking the future passenger over two or more frames of the further image data.

In some embodiments, not only image data of a face of the future passenger may be used, but other biometric features as well, such as a gait of the future passenger. For example, the identification information may comprise information on the gait of the future passenger, or the processing circuitry may be configured to receive the information on the gait of the future passenger directly from the mobile device of the future passenger, and to compare the information on the gait of the future passenger with a gait of persons visible in the further image data.

The above concepts for locating the future passenger may be combined to provide a more precise location of the future passenger. For example, the processing circuitry may be configured to determine a probability distribution regarding the location of the future passenger based on the UWB-based localization and based on the visual identification (based on the face and/or based on the gait).

Additionally or alternatively, the image data of the user may be used to grant access to the vehicle. For example, the processing circuitry may be configured to obtain further image data from a camera sensor 120 of the vehicle based on the determined location of the future passenger. The processing circuitry may be configured to compare the further image data to the image data received from the mobile device of the passenger (or the image data that is comprised in the identification information), and to provide access to the vehicle if a similarity between the further image data and the received image data is higher than a similarity threshold. In other words, the processing circuitry may be configured to verify the identity of the future passenger by comparing a person depicted in the image data to a person visible in the further image data, and to grant access to the vehicle if the person depicted in the image data corresponds to the person visible in the further image data.

The processing circuitry is configured to compute the guidance information based on the location of the future passenger of the vehicle. In this context, two types of guidance information are feasible— guidance information for the vehicle (e.g. for an automated driving system of the vehicle or for a driver of the vehicle), and guidance information for the future passenger.

For example, the guidance information may comprise guidance information for the vehicle, i.e. for a driver of the vehicle or for an automated driving system of the vehicle. The driver or automated driving system of the vehicle may use the guidance information to drive the vehicle to, and halt at, an appropriate halting position relative to the vehicle. Thus, the guidance information may indicate or comprise a location of the future passenger relative to the vehicle (e.g. the location of the future passenger that is based on thy ultra-wideband communication and/or based on the visual identification).

In some embodiments, the guidance information for the vehicle is provided to a human driver of the vehicle, e.g. via an internal display of the vehicle, or via a display of a mobile device of the driver. In other words, the guidance information may be provided to a display of the vehicle or to mobile device of the driver via the interface 12. The human driver may use the guidance information twofold—to identify the driver, and to learn about an appropriate halting position of the vehicle. Accordingly, the guidance information may comprise the image data of the future passenger received from the mobile device of the passenger. The image data of the future passenger may be shown on the respective display. Additionally or alternatively, the guidance information for the vehicle may comprise information on a halting position of the vehicle for providing access to the future passenger. For example, the information on the halting position may be represented by position coordinates, or, in case the guidance information is provided to the driver, by a portion that is highlighted in a representation of the road in vicinity of the halting position. In some embodiments, the guidance information for the vehicle may be provided to an automated driving system 130 of the vehicle (via the interface 12). In this case, the information on the halting position may be represented by position coordinates that may be used by the automated driving system to navigate the vehicle to the halting position.

In both cases, the (appropriate) halting position may be determined by the processing circuitry based on the location of the future passenger. In other words, the processing circuitry may be configured to determine the halting position of the vehicle based on the location of the future passenger. For example, in a simple embodiment, the processing circuitry may be configured to select the halting position that is closest to the future passenger. In some embodiments, however, other factors might be considered as well. For example, the processing circuitry may be configured to process an environment of the future passenger to determine the halting position. For example, the processing circuitry may be configured to identify one or more (permanent or temporary) obstacles and/or a height of a curb within the environment of the future passenger, and to determine the (appropriate) halting position based on the identified one or more obstacles and/or based on the identified height of the curb, e.g. to avoid obstacles that block or hinder access to the vehicle, or to enable access to the vehicle at a convenient height of the curb. In some embodiments, the environment may be processed using highly detailed maps of the environment of the future passenger. Alternatively or additionally, the environment may be processed using one or more sensors of the vehicle. For example, the processing circuitry may be configured to obtain sensor data relating to the environment of the future passenger from one or more sensors 120; 140 of the vehicle. For example, the sensor data relating to the environment of the future passenger may correspond to or comprise the further image data. Additionally or alternatively, the sensor data relating to the environment of the future passenger may comprise sensor data of a perception sensor, e.g. of another camera sensor, of a lidar sensor or of an ultrasound sensor. In other words, the one or more sensors 120; 140 may comprise one or more of the camera sensor 120, a further camera sensor 140, a lidar sensor 140, and an ultrasound sensor 140. The processing circuitry may be configured to process the sensor data to process the environment of the future passenger. For example, the processing circuitry may be configured to identify one or more (permanent or temporary) obstacles and/or a height of a curb within the environment of the future passenger based on the sensor data. The processing circuitry may be configured to select a halting position that provides a trade-off between a distance to the location of the future passenger and an accessibility (in terms of obstacles or curb height) of the vehicle at the halting position.

In some embodiments, the processing circuitry may be configured to determine the halting position based on information on a vehicle door to be used by the future passenger for access to the vehicle. For example, some passengers have preferred seating positions within the vehicle (e.g. in the front, in the back, left, right etc.), passengers traveling in a group may be seated next to each other, or some door may be more accessible than others to passengers with disabilities. Therefore, the information on a vehicle door to be used may be received as part of the identification information. The processing circuitry may be configured to determine the halting position such that the door to be used for the future passenger is located, at the halting position, at the position that is closest to the future passenger, or at the position that provides a trade-off between a distance to the location of the future passenger and an accessibility (in terms of obstacles or curb height) of the door to be used by the passenger.

In some embodiments, guidance information may additionally or alternatively be provided to the future passenger, e.g. via an external display of the vehicle, or via the mobile device of the vehicle. In other words, the guidance information may comprise guidance information for the future passenger. The guidance information may indicate a location of the vehicle relative to the future passenger. The guidance information may be provided to the future passenger via a (external) display 150 of the vehicle (via the interface 12) or via the mobile device of the future passenger (via the interface 12 and a transceiver of the vehicle). For example, the guidance information may be provided to the mobile device of the passenger to provide an augmented-reality view of the environment of the future passenger, with the vehicle being highlighted within the augmented-reality view, or to provide an arrow indicating a direction of the vehicle relative to the future passenger via the mobile device.

The interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information.

In embodiments the processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general-purpose processor, a Digital Signal Processor (DSP), a micro-controller, etc.

In at least some embodiments, the memory circuitry 16 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

The transceiver 110 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. In embodiments, the transceiver 110 is suitable for, i.e. configured to, communicate via ultra-wideband communication, e.g. according to an ultra-wideband communication protocol. In various embodiments, the transceiver 110 may be configured to other short-range or cellular mobile communication systems as well. For example, the transceiver 110 may be configured to communicate via Bluetooth (Low Energy), and/or via one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WI-MAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc. In some embodiments, the functionality of the transceiver 110 may be provided by a single transceiver circuitry. In some embodiments, however, multiple transceivers may be used together as the logical entity "transceiver 110", i.e. the transceiver 110 may comprise one or more transceivers for communicating via different mobile communication systems and communication protocols.

In general, the camera sensor 120 may comprise an APS (Active Pixel Sensor)—or a CCD (Charge-Coupled-Device)-based imaging sensor. For example, in APS-based imaging sensors, light is recorded at each pixel using a photodetector and an active amplifier of the pixel. APS-based imaging sensors are often based on CMOS (Complementary Metal-Oxide-Semiconductor) technology. In CCD-based imaging sensors, incoming photons are converted into electron charges at a semiconductor-oxide interface, which are subsequently moved between capacitive bins in the imaging sensor by a control circuitry of the sensor imaging module to perform the imaging. Alternatively, or additionally, the camera sensor 120 may be a depth-sensing camera or comprise a depth sensor, suitable for providing depth-sensing further image data. Accordingly, the further image data may be a depth-sensing further image data or comprise a two-dimensional and a depth-sensing component. For example, the camera sensor 120 may comprise a depth sensor, e.g. a Time of Flight-based depth sensor or a structured light-based depth sensor. The further image data may comprise two-dimensional camera image data and/or three-dimensional camera image data.

For example, the vehicle 100 may be a land vehicle, a road vehicle, a car, an automobile, an off-road vehicle, a motor vehicle, a truck or a lorry. In some embodiments, the vehicle may be an autonomously or semi-autonomously operated vehicle. In this case, the vehicle may comprise the automated driving system 130 (i.e. an autonomous driving system), i.e. an automated system that is capable of autonomously operating the vehicle in traffic.

For example, the external display 150 may be one of an LCD (Liquid Crystal Display), an OLED (Organic Light Emitting Diode) display, a micro- or mini-LED display and a lighting arrangement for conveying information (e.g. such as an arrow of light).

More details and aspects of the apparatus 10 and of the vehicle 100 are mentioned in connection with the proposed concept or one or more examples described above or below (e.g. FIG. 2). The apparatus 10/vehicle 100 may comprise one or more additional optional features corresponding to one or more aspects of the proposed concept or one or more examples described above or below.

Figure 2:
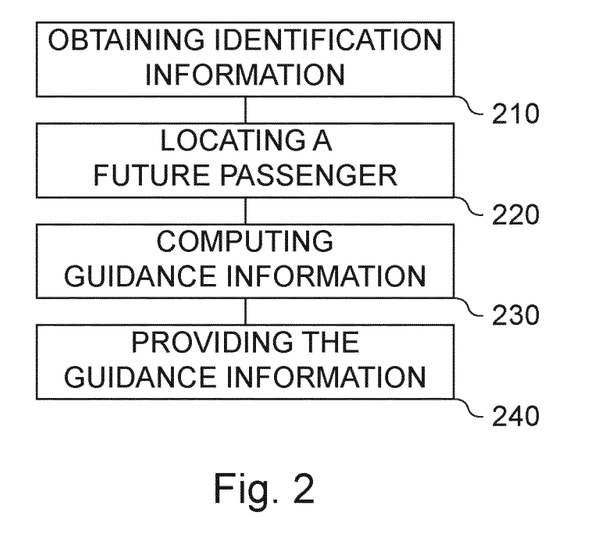
FIG. 2 shows a flow chart of a method for a vehicle.

FIG. 2 shows a flow chart of an embodiment of a corresponding method for a vehicle. The method comprises obtaining 210 identification information on a future passenger of the vehicle. The identification information comprises an ultra-wideband communication identification of a mobile device of the future passenger. The method comprises locating 220 the future passenger outside the vehicle using ultra-wideband communication. The ultra-wideband communication is performed between an ultra-wideband transceiver of the vehicle and the mobile device of the future passenger and is based on the ultra-wideband communication identification of the mobile device. The method comprises computing 230 guidance information based on the location of the future passenger of the vehicle. The method comprises providing 240 the guidance information via an interface.

Features described in connection with the apparatus 10 vehicle 100 of FIGS. 1a and/or 1b may be likewise applied to the method of FIG. 2. For example, the method may comprise features that are provided by the processing circuitry 14 of FIGS. 1a and/or 1b in conjunction with the other devices shown in FIGS. 1a and/or 1b.

More details and aspects of the method are mentioned in connection with the proposed concept or one or more examples described above or below (e.g. FIGS. 1a and/or 1b). The method may comprise one or more additional optional features corresponding to one or more aspects of the proposed concept or one or more examples described above or below.

At least some embodiments relate to a concept for providing a comfortable and precise passenger pick up. The concept may use UWB as basis for a comparatively exact relative positioning of 2 objects (e.g. vehicle and mobile phone/mobile device). In the concept, Cameras and image recognition, as well as biometric recognition and identification of persons, also in vehicles, may be used. GPS (Global Positioning System) and DPGS (Differential Global Positioning System) may be used as basis for the localization. In the concept, digital displays in the vehicle or on a mobile application, with which a ride-hailing customer (taxi customer) can recognize the right=reserved taxi for them, may be used. The concept may further provide a procedure to determine a good position at which a customer can enter/exit (e.g. bus stops, exclusion of intersections, etc.)

An exemplary implementation may comprise one or more of the following components:

A computing system (e.g. the processing circuitry 14) having at least one unique (and later identifiable and locatable by the vehicle) characteristic of a person (e.g. the identification information). This can be, for example:
  an identifier of a UWB system that the customer carries with him
  a current optical image of the customer and/or the face
  a representation of a biometric feature that is optically recognizable at a distance (e.g. face or gait)

A sensor system in the vehicle (e.g. the processing circuitry 14 using the transceiver 110, the camera sensor 120 and/or the sensor 140) that can recognize the customer's feature and can position itself relative to it.

Optionally, a digital map and/or a sensor system for classifying the condition at the roadside (e.g. railings that would prevent getting in), i.e. the environment of the future passenger, as well as a system for calculating a meaningful/ideal point of entry (i.e. the halting position), which may take into account further individual parameters of the person and the vehicle (e.g. automated doors, handicap of the person (e.g. the grandmother can only drive in front) etc.).

Optionally, a system in which it is stored (manually or automatically) at which door the person (i.e. future passenger) to be admitted should or would like to enter.

Optionally, a system for communication (visual, digital, acoustic) between the person and the vehicle in such a way that the person to be admitted is informed that the vehicle has recognized the person and is currently on the concrete approach to the person.

Optionally, a display system for the driver of the vehicle on which a current image of the person is displayed (e.g. Person simply does this on-the-fly in Selfie)

The system of the vehicle may be started manually or context-based (so that the detection does not have to run permanently), e.g. on the basis of spatial proximity based on GPS Optionally, a computing system may be provided that uses several of the above input parameters or systems to improve the quality of the system.

Below, five exemplary scenarios are introduced.

In a first scenario, a customer waits at the airport for "his" ride-hailing vehicle. The customer makes a selfie, this is stored in the system, correlated there with the vehicle to be picked up, and displayed to the driver of the vehicle, enabling the driver to find the right person.

The second scenario is similar to the first scenario, but occurs fully automated, as an environment/camera system searches for a sufficient match of the person in the photo and the current camera position.

The third scenario is similar to the second scenario, but based on a known "fingerprint" of the face (i.e. current selfie might be used).

In the fourth scenario, a radio identification of a mobile system/device (smartphone/watch, etc.) is stored in the system (e.g. the ultra-wideband identification), which the customer currently carries with him and which may be positioned (exactly) relative to each other via this radio link.

In the fifth scenario, the quality of the system may be increased by using a combination of the above-mentioned methods and calculating a probability distribution regarding the location.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for a vehicle, the apparatus comprising processing circuitry configured to:
    obtain identification information on a future passenger of the vehicle, the identification information comprising an ultra-wideband communication identification of a mobile device of the future passenger;

locate the future passenger outside the vehicle using ultra-wideband communication, the ultra-wideband communication being performed between an ultra-wideband transceiver of the vehicle and the mobile device of the future passenger and being based on the ultra-wideband communication identification of the mobile device;

compute guidance information based on the location of the future passenger of the vehicle; and provide the guidance information via an interface;

wherein the processing circuitry is configured to receive image data of the future passenger from the mobile device of the passenger via a short-range communication transceiver of the vehicle; and wherein the processing circuit is further configured to:

use the determined location of the future passenger to point a camera sensor; and obtain further image data from a camera sensor of the vehicle based on the determined location of the future passenger;

compare the further image data to the received image data.

2. The apparatus according to claim 1, wherein the processing circuitry is configured to locate the future passenger by determining a time of flight of the ultra-wideband communication and by determining an angle of arrival of the ultra-wideband communication.

3. The apparatus according to claim 1, wherein the processing circuitry is configured to provide access to the vehicle if a similarity between the further image data and the received image data is higher than a similarity threshold.

4. The apparatus according to claim 1, wherein the guidance information comprises guidance information for the future passenger, the guidance information indicating a location of the vehicle relative to the future passenger, wherein the guidance information is provided to the future passenger via a display of the vehicle or via the mobile device of the future passenger.

5. The apparatus according to claim 1, wherein the processing circuitry is configured to perform a visual identification of the future passenger based at least in part on the received image data, and locate the future passenger outside the vehicle further using the visual identification of the future passenger.

6. The apparatus according to claim 1, wherein the guidance information comprises guidance information for the vehicle, the guidance information indicating a location of the future passenger relative to the vehicle.

7. The apparatus according to claim 6, wherein the guidance information for the vehicle is provided to an automated driving system of the vehicle.

8. The apparatus according to claim 7, wherein the guidance information for the vehicle comprises information on a halting position of the vehicle for providing access to the future passenger, wherein the processing circuitry is configured to determine the halting position of the vehicle based on the location of the future passenger.

9. The apparatus according to claim 6, wherein the guidance information for the vehicle comprises information on a halting position of the vehicle for providing access to the future passenger, wherein the processing circuitry is configured to determine the halting position of the vehicle based on the location of the future passenger.

10. The apparatus according to claim 9, wherein the processing circuitry is configured to process an environment of the future passenger to determine the halting position.

11. The apparatus according to claim 10, wherein the processing circuitry is configured to obtain sensor data relating to the environment of the future passenger from one or more sensors of the vehicle, and to process the sensor data to process the environment of the future passenger, and/or wherein the processing circuitry is configured to determine the halting position based on information on a vehicle door to be used by the future passenger for access to the vehicle.

12. The apparatus according to claim 6, wherein the guidance information for the vehicle is provided such that the guidance information is perceptible to a human driver of the vehicle.

13. The apparatus according to claim 12, wherein the guidance information comprises image data of the future passenger received from the mobile device of the passenger.

14. An apparatus for a vehicle, the apparatus comprising processing circuitry configured to:

obtain identification information on a future passenger of the vehicle, the identification information comprising an ultra-wideband communication identification of a mobile device of the future passenger;

locate the future passenger outside the vehicle using ultra-wideband communication, the ultra-wideband communication being performed between an ultra-wideband transceiver of the vehicle and the mobile device of the future passenger and being based on the ultra-wideband communication identification of the mobile device;

compute guidance information based on the location of the future passenger of the vehicle; and provide the guidance information via an interface;

wherein the processing circuitry is configured to receive image data of the future passenger from the mobile device of the passenger via a short-range communication transceiver of the vehicle; and wherein the processing circuit is further configured to:

obtain further image data from a camera sensor of the vehicle based on the determined location of the future passenger; and compare the further image data to the received image data using only a section of the further image data that corresponds to the determined location of the future passenger.

15. The apparatus according to claim 14, wherein the processing circuitry is configured to provide access to the vehicle if a similarity between the further image data and the received image data is higher than a similarity threshold.

16. The apparatus according to claim 15, wherein the guidance information comprises guidance information for the future passenger, the guidance information indicating a location of the vehicle relative to the future passenger, wherein the guidance information is provided to the future passenger via a display of the vehicle or via the mobile device of the future passenger.

17. The apparatus according to claim 14, wherein the guidance information comprises guidance information for the future passenger, the guidance information indicating a location of the vehicle relative to the future passenger, wherein the guidance information is provided to the future passenger via a display of the vehicle or via the mobile device of the future passenger.

18. An apparatus for a vehicle, the apparatus comprising processing circuitry configured to;

obtain identification information on a future passenger of the vehicle, the identification information comprising an ultra-wideband communication identification of a mobile device of the future passenger;

locate the future passenger outside the vehicle using ultra-wideband communication, the ultra-wideband communication being performed between an ultra-wideband transceiver of the vehicle and the mobile device of the future passenger and being based on the ultra-wideband communication identification of the mobile device;

compute guidance information based on the location of the future passenger of the vehicle; and provide the guidance information via an interface;

wherein the processing circuitry is configured to receive image data of the future passenger from the mobile device of the passenger via a short-range communication transceiver of the vehicle;

wherein the processing circuitry is configured to perform a visual identification of the future passenger based at least in part on the received image data, and locate the future passenger outside the vehicle further using the visual identification of the future passenger; and wherein the processing circuitry is further configured to determine probability information regarding the location of the future passenger based a location determined using the ultra-wideband communication with of the mobile device and the visual identification of the future passenger.

* * * * *